Oct. 29, 1935.         H. HASTINGS         2,019,221
THERMOMETER
Filed March 21, 1932
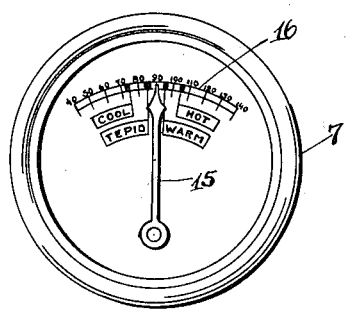
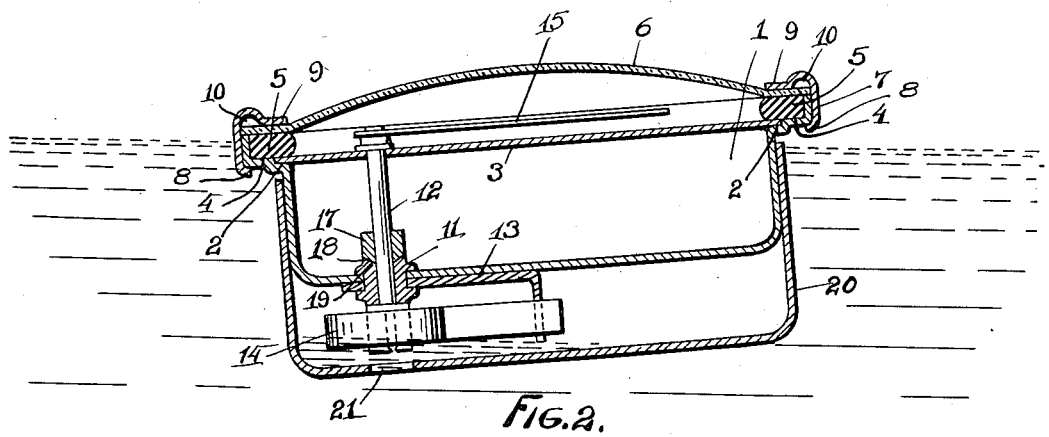
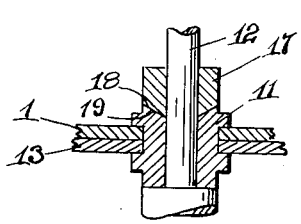
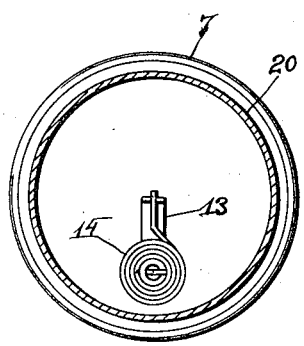
INVENTOR
HERBERT HASTINGS
BY
ATTORNEY Patented Oct. 29, 1935

2,019,221

UNITED STATES PATENT OFFICE 2,019,221

THERMOMETER

Herbert Hastings, Brighton, N. Y.

Application March 21, 1932, Serial No. 600,257

10 Claims. (Cl. 73—118)

This invention relates to bath thermometers and has for its object to provide a novel construction which makes possible the use of a dial and indicator operated by a bi-metallic thermostat member for this type of thermometer.

Another object is to so construct the thermometer that moisture cannot enter the dial chamber and befog the inside of the crystal of the thermometer and prevent a proper reading thereof.

Another object of this invention is to provide a housing for such a thermometer which is divided into compartments which are so arranged and divided that water can enter to make contact with the bi-metallic thermostat operating member, but may not enter other parts of the thermometer while keeping the housing afloat in a predetermined position.

Another object of this invention is to seal one or more of the compartments of the housing from within and without to prevent the accumulation of moist air therein.

Another object of this invention is to provide a novel form of seal around the stem of the indicator shaft which transmits the motion of the bi-metallic thermostat member to the indicator.

These and other objects of this invention will become more readily apparent from a detailed description of the invention, reference being had to the accompanying drawing in which Figure 1 is a top plan view of the thermometer.

Figure 2 is an enlarged vertical sectional view thereof.

Figure 3 is an enlarged detail sectional view of the indicator shaft mounting and the seal cooperating therewith.

Figure 4 is a horizontal sectional view of the lower section of the thermometer showing the bi-metallic thermostat element and its mounting.

In the several figures of the drawing like reference numerals indicate like parts.

The thermometer construction forming the subject matter of my present invention makes possible the use of a bimetallic thermostat member in combination with an air chamber which permits water to enter and make contact with the thermostat member for a quick indication of the temperature thereof, but keeps the water from other parts of the air chamber in order to keep the housing of the thermometer buoyant in a predetermined position to permit the reading of the indication of the temperature on the thermometer while it is afloat.

As illustrated in the figures, the thermometer housing is made up of a shell 1 which is closed at the bottom and has its open top flared outwardly to form a seat 2 for the dial 3 to rest therein. Surrounding the dial is a second seat 4 in the flared top of the shell and in this latter seat is mounted the rubber gasket 5 which overhangs the edge of the dial 3 mounted in the seat 2. The crystal 6, made of glass, celluloid or other suitable transparent material, is preferably convexed in the center and flat at the edge so that the flat edge is adapted to rest on the rubber gasket 5.

A bezel 7 surrounds the flared end of the shell 1 and the inwardly projecting flange 8 provided at the bottom of this bezel engages the under side thereof. The top flange 9 of the bezel overhangs the flat rim of the crystal 6 and this flange is formed with an annular groove 10 on the under side so that only the outer portion of the flange rests on the flattened rim of the crystal. The bezel is applied by pressure and the flange 9 thereof exerts pressure within the periphery of the rim of the crystal and forces it down onto the rubber gasket 5 to compress the gasket against the edge of the dial 3 and seat 4 to hold it compressed and expand it against the flared side of the shell. In this way the top of the shell, forming the dial chamber, is tightly sealed so that neither air nor water can enter or leave it.

In the closed bottom of the shell 1 is provided the bearing 11 for the indicator shaft 12. This bearing consists of a bushing which projects thru a suitable hole provided in the bottom of the shell and another hole provided in the adjusting bracket 13 to form a pivot for this bracket and hold it in place on the outside of the bottom of the shell. The bushing has a shoulder formed near each end thereof, one of which is preferably formed thereon before it is inserted into the shell while the other is formed by upsetting the metal of the bushing after it has been inserted in order to firmly anchor and clamp the bushing in the shell and provide a seal around the inner edge of the opening into which it has been anchored.

The indicator shaft 12 is mounted to rock in the bushing 11 and extends to the outside thereof to have one end of the coiled bi-metallic thermostat member 14 suitably keyed thereto. On the inside of the shell 1 the indicator shaft extends thru a suitable opening in the dial 3 and carries on the end thereof above the dial 3 the indicator hand 15. The hand projects over the dial to the calibrations 16 provided on the face of it to indicate the temperature thereon.

On the indicator shaft is mounted a hub member 17 having a conical end 18. This conical end of the hub member 17 projects into the conical seat 19 provided in the inner end of the bushing 11 which forms a valve seat which prevents water or moisture from entering the shell thru the bushing 11 around the indicator shaft 12. The weight of the indicator assembly, which includes the indicator hand, the indicator shaft, its hub member and the bi-metallic thermostat member, holds the two conical surfaces on the hub member and the bushing respectively in constant frictional contact with each other to keep the valve joint formed thereby tight.

Nested over the shell 1 is a second shell 20 which provides a chamber below that of the chamber formed by the shell 1 and encases the thermostat member located on the outside of the shell 1. In the bottom of the shell 20 is provided an opening 21 at a point opposite the location of the thermostat member and this opening serves as an inlet for a small quantity of water when the thermometer is floating in the water. Shell 1 and shell 20 together form the housing for the complete thermometer.

In measuring the temperature of the water, the thermometer is placed into it with the dial facing upwardly so that the thermometer floats in the water as illustrated in Figure 2. This allows a small quantity of water to enter into the inlet 21 into contact with the thermostat member 14 which quickly responds to the temperature thereof and operates the indicator hand to immediately indicate the temperature of the water that has been brought in contact with it. Water will enter the inlet 21 until it has compressed the air therein to a point where the pressure of the air within the chamber is greater than the pressure at which the water seeks to enter. For this reason only a small quantity of water will enter the chamber formed by the shell but this is sufficient to bring some water into contact with the thermostat member to have it give an almost immediate indication of the temperature of the water into which the thermometer has been placed.

I claim:

1. A thermometer comprising a floating support having a sealed chamber and an open air chamber, a thermostat member located in said open air chamber and indicating means in said sealed air chamber, a shaft extending from said air chamber into said sealed chamber and connecting said indicating means with said thermostat member.

2. A thermometer having a sealed chamber and an open air chamber with a partition dividing said sealed chamber from said open air chamber, a bushing mounted in said partition and providing a bearing therein, a valve seat provided at one end of said bushing and surrounding said bearing, an indicator shaft mounted to rotate in said bearing, a valve member carried by said shaft and cooperating with said valve seat to seal the space between the shaft and the bearing.

3. In a thermometer the combination of a housing comprising a shell, a gasket seat and a dial seat provided in said shell, a dial seated in said dial seat and closing one end of said shell, a yielding gasket seated on said gasket seat and overhanging the rim of said dial, a crystal on top of said yielding gasket and a bezel overhanging the rim of said crystal and adapted to force said crystal onto said gasket to hold said gasket compressed between the rim of the crystal and the rim of the dial.

4. A thermometer comprising a housing made up of an upper and a lower shell, said upper shell being adapted to nest into said lower shell to provide an air chamber between the bottom of said upper shell and the bottom of said lower shell, the bottom of said lower shell having an opening therein, temperature responsive operating means mounted within the air chamber formed between said upper and said lower shell, a dial forming a partition in said upper shell and forming a second air chamber above said first air chamber, a crystal located above said dial and spaced therefrom and forming a dial chamber above said second chamber, an indicator shaft operated by said temperature responsive operating means and extending from said first chamber thru said second chamber into said dial chamber, a bearing surrounding said indicator shaft between said first and said second chamber, indicating means carried by said indicator shaft in said dial chamber and sealing means carried by said indicator shaft in said second chamber and cooperating with said bearing to prevent moisture from entering said second chamber and said dial chamber from said first chamber.

5. In a thermometer the combination of a shell, a crystal adapted to form an air-tight closure for one end of said shell, a graduated plate supported in said shell at a spaced distance from said crystal, said plate provided with a bearing for a rockshaft, a rockshaft in said bearing, a pointer carried by said rockshaft and adapted to traverse the graduated portion of said plate, a thermostat connected to said rockshaft on the outside of said shell and adapted to actuate said rockshaft and a second shell having an opening therein surrounding said thermostat for liquid to enter said opening to make contact with said thermostat.

6. In a thermometer the combination of a shell, a transparent plate and a dial plate mounted in one end of said shell and adapted to form a chamber between said plates in said shell, said chamber being airtight except at a predetermined piercing in said dial, a wall in said shell forming a second chamber in said shell between said dial and wall, said chamber being impervious excepting at the above dial piercing and a piercing provided in the wall in line therewith, a rockshaft journaled in said dial and wall piercings, a thermostat mounted outside said shell and its chambers and adapted to oscillate said shaft and a pointer disposed within said first named chamber adapted to be actuated by said shaft.

7. In a thermometer the combination of a shell, a transparent plate and a dial plate mounted in one end of said shell adapted to form a chamber between said plates, said chamber being airtight except at a predetermined piercing in said dial, a wall in said shell forming a second chamber between said dial and wall, said chamber being impervious excepting at the above dial piercing and a piercing provided in the wall in line therewith, a rockshaft journaled in said dial and wall piercings, a thermostat mounted outside said chambers and adapted to oscillate said shaft and a pointer disposed within said first named chamber adapted to be actuated by said shaft, means attached to said shell adapted with said wall to form a third chamber, said third chamber being air-tight excepting at the above named wall piercing and a predetermined piercing in said means.

8. A housing for a thermometer divided into an upper air chamber, an intermediate air chamber, and a lower air chamber, indicating means in the upper air chamber and temperature responsive operating means in the lower air chamber, said lower air chamber having an inlet to admit liquid into said lower air chamber and motion transmitting means for transmitting the motion of said temperature responsive operating means from said lower chamber to said indicating means in said upper air chamber.

9. A floating thermometer comprising a housing made up of a hollow case having a liquid displacement sufficient to keep the housing afloat, the hollow interior of said case being divided into a substantially horizontal dial chamber and a substantially horizontal air chamber, indicating means in the dial chamber and temperature responsive operating means in the air chamber, a connecting shaft connecting said temperature responsive operating means with said indicating means, said air chamber having an inlet to admit liquid thereinto on the floating of the floating thermometer.

10. In a thermometer the combination of a case provided near one end with a bearing for a rockshaft, a transparent cover plate, a dial and a gasket fastened between said cover plate and said case to form an airtight closure in the other end of said case, graduated means on said dial disposed beneath said cover plate, a rockshaft mounted in said bearing, a pointer on said rockshaft and a thermostat on said rockshaft, said case being hollow and having a liquid displacement sufficient to make it float with the cover plate above the level of the liquid and the thermostat below the level of the liquid.

HERBERT HASTINGS.